UNITED STATES PATENT OFFICE 2,179,943

PROCESS FOR THE MANUFACTURE OF AMMONIUM THIOCYANATE

Roger A. Mathes, Akron, Ohio, assignor to The B. F. Goodrich Company, New York, N. Y., a corporation of New York No Drawing. Application September 29, 1938, Serial No. 232,390

8 Claims. (Cl. 23—75)

This invention relates to a process for the manufacture of ammonium thiocyanate. The objects of the invention are the manufacture of ammonium thiocyanate of high purity and in yields which approach the theoretical. A further object is the production of ammonium thiocyanate at an economical cost.

These objects are accomplished by allowing ammonium dithiocarbamate to remain in contact with an organic solvent until the evolution of hydrogen sulfide has ceased. The following equation represents this reaction:

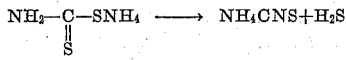

The principal commercial source of ammonium thiocyanate heretofore has been as a by-product obtained during the production of manufactured gas. While a cheap raw material is available, the removal of objectionable impurities to produce pure ammonium thiocyanate results in a much increased cost. Various synthetic methods previously described do not appear to have been successful in producing a pure, inexpensive grade of ammonium thiocyanate. Previous descriptions of the isolation of ammonium thiocyanate from ammonium dithiocarbamate provide for heating solid ammonium dithiocarbamate to evolve hydrogen sulfide. The resulting ammonium thiocyanate is contaminated with free sulfur. A costly purification step, as recrystallization from water, is necessary to procure a product of equal purity to that obtainable by my process.

I have found that when ammonium dithiocarbamate remains in contact with a suitable organic solvent hydrogen sulfide is evolved and ammonium thiocyanate remains. An efficient method for the production of ammonium dithiocarbamate is described in my Patent No. 2,117,619. The preparation of pure ammonium dithiocarbamate made possible by this method is a particular aid in the production of a pure grade of ammonium thiocyanate according to this invention.

Organic solvents suitable for use in this process are those that do not react either with the ammonium dithiocarbamate or with the products of its decomposition, that is, neutral solvents, which are neither acid nor alkaline. The best results are secured with solvents in which salts do not undergo appreciable electrolytic dissociation; that is, non-ionizing solvents. It is also preferred that the solvent be one which does not dissolve the ammonium thiocyanate. The process is considerably simplified by removal of the ammonium thiocyanate by filtration rather than by recovery from solution in the organic solvent. While ammonium dithiocarbamate may be converted to ammonium thiocyanate by remaining in suspension or in solution in an organic solvent at room temperature, the time required for the complete evolution of hydrogen sulfide is quite long. The preferred method, therefore, is to heat the solution or in most cases suspension of ammonium dithiocarbamate in the organic diluent. As the boiling point of the solvent regulates, to a large extent, the temperature conveniently attainable and consequently the time required to complete the elimination of hydrogen sulfide, lower boiling organic solvents are less desirable. Solvents boiling in the range of 100° C. are preferable as the process may be carried out in much less time than is required at lower temperatures. Some organic solvents, as for example, certain low boiling esters, are satisfactory for use in my process at room temperature. However, at elevated temperatures, necessary to carry out the process in a conveniently short time, their use is unsatisfactory. The ammonium dithiocarbamate is completely broken down, ammonia being evolved in addition to hydrogen sulfide and thiocyanic acid formed. Certain ketones, as methyl isobutyl ketone and certain cyclic ethers, as 1,4-dioxane give similar results. Certain esters, as isopropylacetate and certain alcohols, as ethyl alcohol, have the added disadvantage that the ammonium thiocyanate formed is taken into solution. Homologous compounds of sufficiently high molecular weight to approach hydrocarbons in properties and to be substantially non-ionizing give better results.

Hydrocarbons, such as benzene, toluene and various aliphatic hydrocarbons, particularly those boiling in the range of 100° C. are very satisfactory organic diluents for use in this process. The decomposition of ammonium dithiocarbamate is directed in such a way as to produce pure ammonium thiocyanate, whether the process is carried out at room temperature or at the boiling point of the organic solvent. Many other non-ionizing organic solvents, such as the halogenated solvents chlorobenzene and carbon tetrachloride may also be successfully used.

The method according to this invention provides for the use of pre-formed ammonium dithiocarbamate, before agitating with the application of heat in the presence of an organic solvent. For best results the ammonium dithiocarbamate should be of a high degree of purity and may be produced, of course, by any method desired.

The process is preferably carried out in a reactor equipped with an agitator, a reflux condenser and a device for warming such as a jacket for circulating steam. Suitable venting provisions should also be made for the removal of hydrogen sulfide.

Pure ammonium dithiocarbamate is suspended in the organic solvent. A proportion of one part ammonium dithiocarbamate to five parts of the organic diluent by weight, is a convenient concentration. The suspension is agitated, and is preferably heated, whereupon hydrogen sulfide is evolved. In the case of organic solvents boiling at temperatures lower than 120° C., the solvent may be maintained at refluxing temperature. Heating is continued until the evolution of hydrogen sulfide has ceased, which at temperatures in the neighborhood of 100° C. requires in most cases from three to twelve hours. During this period, the suspension is seen to change gradually in appearance. The light, fluffy suspension of ammonium dithiocarbamate gives way to a heavier, crystalline suspension of ammonium thiocyanate. After cooling to room temperature the white, crystalline ammonium thiocyanate is filtered off and dried. In cases where high boiling solvents are employed a wash with a low boiling, volatile solvent aids in drying. The organic solvent may be used repeatedly in the process before requiring purification, as by distillation.

The following examples describe the process more specifically, but it will be understood that the invention is not limited to these details. Wide variations are possible without materially affecting the results.

*Example 1*

25 g. of pure ammonium dithiocarbamate are suspended in 130 cc. of toluene in a flask provided with a reflux condenser and a stirrer. Heat is applied and the toluene maintained at the refluxing temperature until the evolution of hydrogen sulfide is complete, a period of about three hours. During the heating period the physical appearance is observed to change from the rather light, slightly yellow suspension of ammonium dithiocarbamate to the heavier, more defined, white crystals of ammonium thiocyanate. The ammonium thiocyanate is filtered off and dried. The dry weight is 16.5 g. representing a 95.5% yield. The product is white, entirely water soluble and analysis shows a purity of 99.7%.

*Example 2*

30 g. of pure ammonium dithiocarbamate are suspended in 150 cc. of benzene in a flask provided with a reflux condenser and a stirrer.

The process as described in Example 1 is carried out. About twelve hours at the refluxing temperature are necessary to completely remove hydrogen sulfide. The dry weight is 19.9 g. representing a 96% yield. The product is white, entirely water soluble and melts at 149°–150° C.

The process may be carried out as explained in the examples, using a wide variety of organic solvents. The invention is not limited to the use of the general groups of solvents or solvents specifically named. Many additional organic diluents will be found equally as desirable.

From the data herein presented the fact will be readily apparent that this invention provides a practical commercial method for the manufacture of ammonium thiocyanate. Many obstacles of previous processes have been overcome.

Yields of 95% are readily obtainable. The product as obtained directly from the process is of high purity, making further purification unnecessary. Ammonium thiocyanate prepared by other processes almost invariably contains impurities such as free sulfur, thiourea, etc. A purification, as a recrystallization from water, is necessary. As a raw material, ammonium dithiocarbamate is readily available by an inexpensive synthesis and is in itself very pure. The process is short and requires only ordinary plant equipment. The organic diluent may be used many times without requiring purification. Inexpensive and readily available organic solvents may be used.

The term solvent is employed herein in the broad sense customary with chemists to denote liquids useful as solvents regardless of whether or not they actually dissolve any specific compounds.

I claim:

1. A process for the manufacture of ammonium thiocyanate which comprises heating a suspension of ammonium dithiocarbamate in a neutral, non-ionizing, organic solvent in which the product is practically insoluble, to a temperature not over about 100° C. until the evolution of hydrogen sulfide is complete.

2. A process as in claim 1 in which the product is removed by filtration.

3. A process for the manufacture of ammonium thiocyanate which comprises heating a suspension of ammonium dithiocarbamate in a liquid hydrocarbon to a temperature not over about 100° C. until the evolution of hydrogen sulfide is complete.

4. A process according to claim 3 where the ammonium thiocyanate formed is removed by filtration.

5. A process for the manufacture of ammonium thiocyanate which comprises heating a suspension of ammonium dithiocarbamate in a liquid, aromatic hydrocarbon to a temperature not over about 100° C. until the evolution of hydrogen sulfide is complete.

6. A process for the manufacture of ammonium thiocyanate which comprises heating a suspension of ammonium dithiocarbamate in a halogenated hydrocarbon solvent to a temperature not over about 100° C. until the evolution of hydrogen sulfide is complete.

7. A process for the manufacture of ammonium thiocyanate which comprises heating a suspension of ammonium dithiocarbamate in toluene to a temperature not over about 100° C. until the evolution of hydrogen sulfide is complete.

8. A process for the manufacture of ammonium thiocyanate which comprises heating a suspension of ammonium dithiocarbamate in refluxing benzene until the evolution of hydrogen sulfide is complete.

ROGER A. MATHES.